(12) United States Patent
Balasubramaniam et al.

(10) Patent No.: US 10,021,112 B2
(45) Date of Patent: *Jul. 10, 2018

(54) SYSTEM, METHOD AND COMPUTER PROGRAM PRODUCT FOR PERFORMING ONE OR MORE MAINTENANCE TASKS ON A REMOTELY LOCATED COMPUTER CONNECTED TO A SERVER COMPUTER VIA A DATA NETWORK

(71) Applicant: McAfee, LLC, Plano, TX (US)

(72) Inventors: Chandrasekar Balasubramaniam, Sunnyvale, CA (US); Ravi Kannan, Sunnyvale, CA (US); Siddaraya Basappa Revashetti, Pune (IN); Srivats Sampath, San Jose, CA (US); Babu Katchapalayam, Santa Clara, CA (US)

(73) Assignee: McAfee, LLC, Plano, TX (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/583,573

(22) Filed: Dec. 26, 2014

(65) Prior Publication Data

US 2015/0207802 A1    Jul. 23, 2015

Related U.S. Application Data

(63) Continuation of application No. 14/209,064, filed on Mar. 13, 2014, which is a continuation of application
(Continued)

(51) Int. Cl.
*H04L 29/06* (2006.01)
*H04L 29/08* (2006.01)
(Continued)

(52) U.S. Cl.
CPC ................ *H04L 63/12* (2013.01); *G06F 8/65* (2013.01); *H04L 63/08* (2013.01); *H04L 63/083* (2013.01);
(Continued)

(58) Field of Classification Search
USPC .......................................................... 705/30
See application file for complete search history.

(56) References Cited

U.S. PATENT DOCUMENTS 4,780,821 A * 10/1988 Crossley ................ H04L 29/00
340/5.74
4,897,781 A    1/1990 Chang et al.
(Continued)

FOREIGN PATENT DOCUMENTS

EP    398647    11/1990
EP    770965    5/1997
(Continued)

OTHER PUBLICATIONS

Hastings, Reed et al. "Purify: Fast Detection of Memory Leaks and Access Errors," USENIX—Jan. 20-24, 1992: 125-136 (13 pages).
(Continued)

*Primary Examiner* — Garcia Ade
(74) *Attorney, Agent, or Firm* — Patent Capital Group

(57) ABSTRACT

A method and computer executable program code are disclosed for performing one or more maintenance tasks on a remotely located computer connected to a server computer via a data network.

20 Claims, 8 Drawing Sheets

Related U.S. Application Data

No. 12/266,413, filed on Nov. 6, 2008, now Pat. No. 8,706,576, which is a continuation of application No. 11/855,970, filed on Sep. 14, 2007, now Pat. No. 7,472,419, which is a continuation of application No. 11/316,562, filed on Dec. 21, 2005, now Pat. No. 7,480,941, which is a continuation of application No. 11/256,521, filed on Oct. 20, 2005, now abandoned, which is a continuation of application No. 10/265,030, filed on Oct. 4, 2002, now Pat. No. 6,988,209, which is a continuation of application No. 09/248,115, filed on Feb. 11, 1999, now Pat. No. 6,499,109, which is a continuation-in-part of application No. 09/208,735, filed on Dec. 8, 1998, now Pat. No. 6,266,774.

(51) Int. Cl.
G06F 8/65 (2018.01)
G06F 13/14 (2006.01)

(52) U.S. Cl.
CPC ............ *H04L 63/10* (2013.01); *H04L 63/123* (2013.01); *H04L 63/145* (2013.01); *H04L 63/1408* (2013.01); *H04L 67/10* (2013.01); *H04L 67/26* (2013.01); *H04L 69/329* (2013.01); *H04L 63/0236* (2013.01)

(56) References Cited

U.S. PATENT DOCUMENTS

| | | |
|---|---|---|
| 4,974,149 A | 11/1990 | Valenti |
| 5,121,345 A | 6/1992 | Lentz |
| 5,155,847 A | 10/1992 | Kirouac et al. |
| 5,287,507 A | 2/1994 | Hamilton et al. |
| 5,347,632 A | 9/1994 | Filepp et al. |
| 5,388,255 A | 2/1995 | Pytlik et al. |
| 5,390,256 A | 2/1995 | Mandell et al. |
| 5,421,009 A * | 5/1995 | Platt .................... G06F 8/64 709/219 |
| 5,452,447 A | 9/1995 | Nelson et al. |
| 5,473,772 A | 12/1995 | Halliwell et al. |
| 5,555,416 A | 9/1996 | Owens et al. |
| 5,581,764 A | 12/1996 | Fitzgerald et al. |
| 5,608,805 A | 3/1997 | Mandell et al. |
| 5,623,600 A | 4/1997 | Ji et al. |
| 5,678,041 A | 10/1997 | Baker et al. |
| 5,684,957 A | 11/1997 | Kondo et al. |
| 5,696,898 A | 12/1997 | Baker et al. |
| 5,715,403 A | 2/1998 | Stefik |
| 5,732,266 A | 3/1998 | Moore et al. |
| 5,742,759 A | 4/1998 | Nessett et al. |
| 5,742,829 A | 4/1998 | Davis et al. |
| 5,764,913 A | 6/1998 | Jancke et al. |
| 5,784,563 A | 7/1998 | Marshall et al. |
| 5,793,966 A | 8/1998 | Amstein et al. |
| 5,794,259 A | 8/1998 | Kikinis |
| 5,796,952 A | 8/1998 | Davis et al. |
| 5,802,276 A | 9/1998 | Benatar et al. |
| 5,802,530 A | 9/1998 | Van Hoff |
| 5,835,911 A | 11/1998 | Nakagawa et al. |
| 5,838,906 A | 11/1998 | Doyle et al. |
| 5,841,978 A | 11/1998 | Rhoads |
| 5,845,077 A | 12/1998 | Fawcett |
| 5,845,090 A | 12/1998 | Collins, III et al. |
| 5,864,676 A | 1/1999 | Beer et al. |
| 5,872,914 A | 2/1999 | Walker, Jr. et al. |
| 5,881,236 A | 3/1999 | Dickey |
| 5,892,905 A | 4/1999 | Brandt et al. |
| 5,892,919 A | 4/1999 | Nielsen |
| 5,898,835 A | 4/1999 | Truong |
| 5,910,987 A * | 6/1999 | Ginter .................... G06F 21/10 348/E5.006 |
| 5,918,008 A | 6/1999 | Togawa et al. |
| 5,919,247 A | 7/1999 | Van Hoff et al. |
| 5,928,323 A | 7/1999 | Gosling et al. |
| 5,940,590 A | 8/1999 | Lynne et al. |
| 5,948,104 A | 9/1999 | Gluck et al. |
| 5,950,008 A | 9/1999 | Van Hoff |
| 5,951,698 A | 9/1999 | Chen et al. |
| 5,956,481 A | 9/1999 | Walsh et al. |
| 5,958,051 A | 9/1999 | Renaud et al. |
| 5,960,170 A | 9/1999 | Chen et al. |
| 5,966,698 A | 10/1999 | Pollin |
| 5,991,760 A | 11/1999 | Gauvin et al. |
| 5,991,877 A | 11/1999 | Luckenbaugh |
| 6,006,035 A | 12/1999 | Nabahi |
| 6,009,274 A | 12/1999 | Fletcher et al. |
| 6,023,724 A | 2/2000 | Bhatia et al. |
| 6,035,423 A | 3/2000 | Hodges et al. |
| 6,041,360 A | 3/2000 | Himmel et al. |
| 6,044,471 A * | 3/2000 | Colvin .................... G06F 21/121 705/51 |
| 6,049,671 A | 4/2000 | Slivka et al. |
| 6,065,120 A | 5/2000 | Laursen et al. |
| 6,067,582 A | 5/2000 | Smith et al. |
| 6,073,163 A | 6/2000 | Clark et al. |
| 6,073,172 A * | 6/2000 | Frailong .................... H04L 41/0806 709/222 |
| 6,078,951 A | 6/2000 | Pashupathy et al. |
| 6,083,279 A | 7/2000 | Cuomo et al. |
| 6,091,412 A | 7/2000 | Simonoff et al. |
| 6,092,194 A | 7/2000 | Touboul |
| 6,092,204 A | 7/2000 | Baker |
| 6,105,072 A | 8/2000 | Fischer |
| 6,131,165 A | 10/2000 | Lipkin et al. |
| 6,138,237 A | 10/2000 | Ruben et al. |
| 6,151,609 A | 11/2000 | Truong |
| 6,151,643 A * | 11/2000 | Cheng .................... G06F 8/62 709/200 |
| 6,154,844 A | 11/2000 | Touboul et al. |
| 6,161,130 A | 12/2000 | Horvitz et al. |
| 6,167,567 A | 12/2000 | Chiles et al. |
| 6,169,992 B1 | 1/2001 | Beall et al. |
| 6,173,406 B1 | 1/2001 | Wang et al. |
| 6,185,625 B1 | 2/2001 | Tso et al. |
| 6,202,158 B1 | 3/2001 | Urano et al. |
| 6,208,995 B1 | 3/2001 | Himmel et al. |
| 6,219,790 B1 | 4/2001 | Lloyd et al. |
| 6,240,530 B1 | 5/2001 | Togawa |
| 6,256,668 B1 | 7/2001 | Slivka et al. |
| 6,266,774 B1 | 7/2001 | Sampath et al. |
| 6,269,456 B1 | 7/2001 | Hodges et al. |
| 6,272,631 B1 | 8/2001 | Thomlinson et al. |
| 6,282,652 B1 | 8/2001 | Scheifler |
| 6,286,001 B1 | 9/2001 | Walker et al. |
| 6,321,334 B1 | 11/2001 | Jerger et al. |
| 6,327,617 B1 | 12/2001 | Fawcett |
| 6,345,361 B1 | 2/2002 | Jerger et al. |
| 6,360,255 B1 | 3/2002 | McCormack et al. |
| 6,381,644 B2 | 4/2002 | Munguia et al. |
| 6,434,607 B1 | 8/2002 | Haverstock et al. |
| 6,499,109 B1 | 12/2002 | Balasubramaniam et al. |
| 6,571,256 B1 | 5/2003 | Dorian et al. |
| 6,598,060 B2 | 7/2003 | Goldick |
| 6,622,150 B1 | 9/2003 | Kouznetsov et al. |
| 6,658,568 B1 | 12/2003 | Ginter et al. |
| 6,671,812 B1 | 12/2003 | Balasubramaniam et al. |
| 6,675,162 B1 | 1/2004 | Russell-Falls et al. |
| 6,701,441 B1 | 3/2004 | Balasubramaniam et al. |
| 6,807,559 B1 | 10/2004 | Budhiraja |
| 6,895,513 B1 | 5/2005 | Balasubramaniam et al. |
| 6,963,899 B1 | 11/2005 | Fernandez et al. |
| 6,988,209 B1 | 1/2006 | Balasubramaniam et al. |
| 7,127,609 B2 | 10/2006 | Royer et al. |
| 7,194,764 B2 | 3/2007 | Martherus et al. |
| 7,243,369 B2 | 7/2007 | Bhat et al. |
| 7,472,419 B1 | 12/2008 | Balasubramaniam et al. |
| 7,480,941 B1 | 1/2009 | Balasubramaniam et al. |
| 8,706,576 B1 | 4/2014 | Balasubramaniam et al. |
| 2002/0078345 A1 | 6/2002 | Sandhu et al. |
| 2002/0087660 A1 | 7/2002 | Martin et al. |
| 2002/0124170 A1 | 9/2002 | Johnson, Jr. |

(56) References Cited

U.S. PATENT DOCUMENTS

| | | | |
|---|---|---|---|
| 2002/0165960 | A1 | 11/2002 | Chan |
| 2003/0200442 | A1 | 10/2003 | Bhat et al. |
| 2007/0136579 | A1 | 6/2007 | Levy et al. |
| 2007/0294676 | A1* | 12/2007 | Mellor .................... G06F 8/65 717/139 |
| 2014/0317763 | A1 | 10/2014 | Balasubramaniam et al. |
| 2015/0156256 | A1 | 6/2015 | Balasubramaniam et al. |

FOREIGN PATENT DOCUMENTS

| | | |
|---|---|---|
| EP | 845894 | 9/1999 |
| JP | 2000029883 | 1/2000 |
| WO | WO 98/04976 | 2/1998 |

OTHER PUBLICATIONS

Shaddock, Michael E. et al. "How to Upgrade 1500 Workstations on Saturday, and Still Have Time to Mow the Yard on Sunday", LISA IX Sep. 17-22, 1995:59-65 (8 pages).
Osel, Peter W. et al. "OpenDist—Incremental Software Distribution", LISA IX Sep. 17-22, 1995:181-193 (14 pages).
Eirich, Thomas "Beam: A Tool for Flexible Software Update," LISA Sep. 19-23, 1994:75-82 (9 pages).
Anderson, Paul "Towards a High-Level Machine Configuration System," LISA Sep. 19-23, 1994:19-26 (9 pages).
Rouillard, John P. et al. "Config: A Mechanism for Installing and Tracking System Configurations" LISA Sep. 19-23, 1994:9-17 (10 pages).
Riddle, Paul "Automated Upgrades in a Lab Environment," LISA Sep. 19-23, 1994:33-36 (5 pages).
Wong, Walter "Local Disk Depot—Customizing the Software Environment," LISA Nov. 1-5, 1993:51-55 (6 pages).
/pc/arcers:MS_DOS archiving (compression) programs, University of Vaasa http://garbo.uwasa.fi/pc/arcers.html (4 pages).
"Install", MSDOS»Utilities»Install http://www.bookcase.com/library/software/msdos.util.install.html (12 pages).
Dagenais, Michel et al. "LUDE: A Distributed Software Library," LISA Nov. 1-5, 1993:25-32 (9 Pages).
Futakata, Atsushi "Patch Control Mechanism for Large Scale Software," LSIA IX Sep. 17-22, 1995:213-219 (8 pages).
Cowan, Crispin et al. "StackGaurd: Automatic Adaptive Detection and Prevention of Buffer-Overflow Attacks," USENIX Security Symposium Jan. 26-29, 1998:63-77 (16 pages).
Barrera, Joseph S. III "Self-Tuning Systems Software," IEEE Oct. 14-15, 1993:194-197 (5 pages).
DeSimone, Salvatore et al. "Sysctl: A Distributed System Control Package," LISA Nov. 1-5, 1993:131-143 (14 pages).
"Compromised-Buffer-Overflows, from Intel to SPARC Version 8", Oct. 4, 1996:1-4 (6 pages).
Austin, Todd M. et al. "Efficient Detection of All Pointer and Array Access Errors", ACM SIGPLAN Jun. 20-24, 1994:290-301 (13 pages).
Gwertzman, James S. et al. "The Case for Geographical Push-Caching," IEEE Comput. Soc. Press 1995:51-55 (6 pages).
Husain, Kamran "Extending imake", Dr. Dobb's Journal Jun. 1994:70-76 (5 pages).
Dodge, Chris et al. "Web Cataloguing through cache exploitation and steps toward consistency maintenance", Computer Networks and IDSN Systems Apr. 10-14, 1995:1003-1008 (7 pages).
Glassman, Steven "A Caching Relay for the World Wide Web", Computer Networks and IDSN Systems May 25-27, 1994:165-173 (10 pages).
Berg, Cliff "How Do I Create a Signed Applet," Dr Dobbs Journal Aug. 1997:109-122 (4 pages).
Flower, Eric "Step-Up to MS-DOS 6.2: An Early Look at Microsoft's Latest Upgrade," Computers in Libraries Feb. 1994 vol. 14, No. 2:30-32 (3 pages).
Goldfayn, Alex L. "Software Installs Profit for Area Firm," Business & Technology Keynote Speeches and Seminars, http://www.strategicgrp.com/Articles/Trib/Installshield.htm (4 pages).
Bhatia, Viresh "The Stirling Group Installshield" Chicagobusiness.com Mar. 2, 2005, http://66.102.7.104/search?a=cache:OAMtKhSNN3EJ:http://dev.chicagobusiness.com/cgi-bin/article.pl%3Fportal_id%3D35 (2 pages).
Karnes, Clifton "How to install Windows Programs", Feb. 1994, http://www.atarmagazines.com/compute/issue161/6_how_to_install_windo.php (2 pages).
Software Development "The Jolt and Productivity Awards," http://www.sdmagazine.com/jolts/prev_utl.htm (5 pages).
"Microsoft Word Macro Virus Protection Tool ReadMe", May 10, 1996 File://C:\work\Netwasoc\Miami\5956481\Microsoft Word Macro Virus Protection Tool R . . . (8 pages).
Fryer et al, "Microsoft Press Computer Dictionary," 1997, Microsoft Press, p. 15.
www.mcafee.com, Home—The Place for Your PC, (1 page), Aug. 9, 1999.
www.mcafee.com, Clinic—McAfee Clinic, (1 page), Aug. 9, 1999.
www.mcafee.com, Clinic—Coming Soon, (1 page), Aug. 9, 1999.
www.mcafee.com, Clinic—Optimize Performance, (1 page), Aug. 9, 1999.
www.mcafee.com, Clinic—Clean Hard Drive, (1 page), Aug. 9, 1999.
www.mcafee.com, Clinic—Software Update Finder, (1 page), Aug. 9, 1999.
www.mcafee.com, Clinic—Fees for Mcafee Clinic Premium Services, (2 pages), Aug. 9, 1999.
msdn.microsoft.com, COM Techniques by Panther Software, Introduction, (2 pages), Oct. 7, 1998.
msdn.microsoft.com, The ABCs of MFC ActiveX Controls, (31 pages), Oct. 22, 1996.
msdn.microsoft.com, Web Workshop—Signing and Marking ActiveX Controls, (9 pages), Oct. 15, 1996.
msdn.microsoft.com, Web Workshop—ActiveX Controls Overview, (2 pages), Oct. 23, 1998.
www.microsoft.com, About Microsoft COM, (2 pages), Feb. 25, 1999.
www.microsoft.com, Component Object Model (COM), (2 pages), Mar. 30, 1999.
msdn.microsoft.com, The Component Object Model: A Technical Overview, (19 pages), Oct. 1994.
msdn.microsoft.com, The COM Programmer's Cookbook, (67 pages), Sep. 13, 1995.
msdn.microsoft.com, Events vs. Callbacks, (2 pages), Apr. 1997.
msdn.microsoft.com, Developing Applications with OLE 2.0, (20 pages), Sep. 13, 1994.
msdn.microsoft.com, What OLE is Really About, (45 pages), Jul. 1996.
msdn.microsoft.com, OLE for Idiots: A is for Attitude, (7 pages), Jun. 22, 1993.
msdn.microsoft.com, OLE for Idiots: B is for Beginning, (8 pages), Jun. 22, 1993.
msdn.microsoft.com, OLE for Idiots: C is for Container, (33 pages), Aug. 6, 1993.
msdn.microsoft.com, OLE for Idiots: D is for Dragon, (12 pages), Sep. 20, 1993.
msdn.microsoft.com, OLE Property Sets Exposed, (26 pages), Oct. 6, 1995.
msdn.microsoft.com, OLE Integration Technologies: A Technical Overview, (20 pages), Oct. 1994.
msdn.microsoft.com, Notes on Implementing an OLE Control Container, (66 pages), Sep. 21, 1994.
Guiri et al, "Role-Based Access Control in Java," May 1998, 3rd ACM Workshop on Role-Based Access, p. 91-101.
Kemmerer, Richard "Security Issues in Distributed Software," Nov. 1997, Reliable Software Group, Department of Computer Science Univerisity of California, Santa Barbara, p. 52-59.
"Addamax's UNIX Moves" Nov. 1991, Computer Reseller News, p. 54.
"Lavasoft Ad-aware" Oct. 2001, www.tomcoyote.com/lsmanual.html. (2 pages).

(56) References Cited

OTHER PUBLICATIONS

Brown "Special Edition Using Netscape 2" 1995, Que Communication, 2.sup.nd Edition, p. 864,865,872,873.
Brown "Special Edition Using Netscape 2" 1995, Que Communication, 2.sup.nd Edition, p. 935-936 (6 pages).
Dugan, "ActiveX Technology, You can't go there today", 1997, http:/ww1.infoworld.com/cgi-bin/displayTC.pl?/970519analysis.htm, p. 1-15. (16 pages).
"Microsoft Announces Innovative Security Zones" Jun. 3, 1997, wysiwyg://19/http://www.microsoft.com/presspass/press/1997/Jun97/securipr. asp, p. 1-3.
"Signing with Microsoft Authenticode Technology" 1996, http://support.modempool.com/support/Sweep/sweep075.htm, p. 1-16.
Fryer et al, "Microsoft Press Computer Dictionary" 1997, Microsoft Press, p. 16.
Fryer et al, Microsoft Press Computer Dictionary 1997, Microsoft Press, 3.sup.rd Edition, p. 263, 306. (4 pages).
"McAfee.com Clinic, Your Online Anti-Virus & PC Maintenance Solution User Guide" May 2001, p. 1-50. (50 pages).
"McAfee Office User Guide" Aug. 2001, Version 3.1, p. 150-151.
"Oracle's NCI Introduces NC Software Suite for Both Desktop and NC Server Machines" Apr. 16, 1997, PR Newswire, p. 1-3.
"Symantec jolted by Cafe," News.com, Apr. 28, 1997. (http://news.com.com/2100-1001-279280.html?legacy=cnet).
Cobb, "What to look for in an enterprise anti-virus product" Mar. 1998, Databased Web Advisor via Dialog text search, vol. 16, #3. p. 28-32.
"The Best One Stop Online PC Service on the Planet" Oct. 1997, security-online.com/mall/vendors/tuneup/info-features-tuneup-tuneup.html, p. 1-3.
Randall, "What happens when you click : HTTP: the underlying protocol of the World Wide Web" Oct. 22, 1996, PC Magazine, vol. 15, #18, Dialog Text Search, p. 1-4.
"X.509 Certificates and Certificate Revocation Lists (CRLs)" May 20, 1998, java.sun.com/products/jdk/1.2/docs/guide/security/cert3.html, p. 1-5. (5 pages).
Clyman, John, "Your Guide to Java for 1998"; PC Magazine, Tuesday, Apr. 7, 1998 vol. 17, No. 17.
Mendelson, Edward, "Create Your Own Applets," PC Magazine, Tuesday, Jun. 10, 1997 vol. 16, No. 11.
McClanahan, David, "Use Java to build Dynamic Web Pages" Database Web Advisor, Saturday, Nov. 1, 1997, vol. 15, No. 11.
"GroupShield Exchange User's Guide Version 4.0.3", Apr. 1999, Network Associates, Inc.
"User's Guide GroupShield for Lotus Notes", Oct. 1996, McAfee, Inc.
"User's Guide GroupShield for Windows NT" Sep. 1997, McAfee, Inc.
"User's Guide GroupScan and GroupShield for Lotus Notes", Mar. 1997 McAfee, Inc.
Cooper, Michael A., "Overhauling Rdist for the '90'", LISA VI Oct. 19-23, 1992, Long Beach, CA.
Nachbar, Daniel, "When Network File Systems Aren't Enough: Automatic Software Distribution Revisited", Bell Communication Research, Morristonw, New Jersey (13 pages).
"User's Guide GroupShield for Windows NT", Nov. 1997 McAfee, Inc.
"Microsoft Windows NT Resource Kit for Windows NT Workstation and Windows NT Server Version 3.51", Windows NT Resource Guide, 1995 Microsoft Press.
http://cd.textfiles.com/cream08-02/program/files.bbs, Nov. 2, 2005 (1 page).
"Index of /cream08-02/program", http://cd.textfiles.com/cream08-02/program/?S=A , Nov. 2, 2005 (2 pages).
"files.chatnfiles.com—/The Pier Shareware 7/038/", http://files.chatnfiles.com/The%20Pier%Shareware%207-038/, Nov. 2, 2005.
Kagan, Jeffrey "Never Have Time for Upgrades? Try an Oil Change on your Software" Communications Week Dec. 9, 1996: 48 (1 page).
Frook, John Evan "TunrUp.Com Offers PC Checkups via Web," Communications Week Jun. 10, 1996: S10 (2 pages).
Felten, Edward W. "Webware Security" Communications of the ACM Apr. 1997: 130 (2 pages).
Kobielus, James "A 'Web of Distrust' would Expose 'Net outlaws.", Network World May 26, 1997: 43 (1 page).
Non-Final Office Action in U.S. Appl. No. 14/209,064 dated Sep. 18, 2017.

\* cited by examiner

SYSTEM, METHOD AND COMPUTER PROGRAM PRODUCT FOR PERFORMING ONE OR MORE MAINTENANCE TASKS ON A REMOTELY LOCATED COMPUTER CONNECTED TO A SERVER COMPUTER VIA A DATA NETWORK

This Application is a continuation (and claims the benefit of priority under 35 U.S.C. § 120) of U.S. patent application Ser. No. 14/209,064, filed Mar. 13, 2014 and entitled SYSTEM, METHOD AND COMPUTER PROGRAM PRODUCT FOR PERFORMING ONE OR MORE MAINTENANCE TASKS ON A REMOTELY LOCATED COMPUTER CONNECTED TO A SERVER COMPUTER VIA A DATA NETWORK, which application is a continuation of U.S. patent application Ser. No. 12/266,413 filed on Nov. 6, 2008, now issued as U.S. Pat. No. 8,706,576, which application is a continuation of U.S. patent application Ser. No. 11/855,970, filed on Sep. 14, 2007, now issued as U.S. Pat. No. 7,472,419; which application is a continuation of U.S. patent application Ser. No. 11/316,562, filed on Dec. 21, 2005, now issued as U.S. Pat. No. 7,480,941; which application is a continuation of U.S. patent application Ser. No. 11/256,521, filed on Oct. 20, 2005, which application is a continuation of U.S. patent application Ser. No. 10/265,030, filed on Oct. 4, 2002, now issued as U.S. Pat. No. 6,988,209; which application is a continuation of U.S. patent application Ser. No. 09/248,115, filed on Feb. 11, 2009, now issued as U.S. Pat. No. 6,499,109; which application is a continuation-in-part of U.S. patent application Ser. No. 09/208,735 filed on Dec. 8, 1998, now issued as U.S. Pat. No. 6,266,774. The disclosures of each of the above-named prior Applications are considered part of and are incorporated by reference in their entirety in the disclosure of this Application.

FIELD OF THE INVENTION

This invention relates in general to computer networks.

BACKGROUND OF THE INVENTION

Section A

This relates to a variety of problems such as computer viruses, cleanup of unusable or unwanted programs, and upgrading software that annoy and inconvenience the users of personal computers.

Despite the existence of good programs to detect and remove computer viruses, unscrupulous and adventurous computer programmers frequently try to skirt the virus antidote programs by creating new viruses that are hard to detect or remove. Thus, there is an on-going struggle between the creators of virus programs and the companies that find the antidotes for such viruses. A diligent user of a computer, therefore, must keep abreast of the developments in the computer virus warfare and upgrade to the latest software to detect and eliminate any new virus that may have infected his computer system. An automatic way of upgrading the virus antidote programs would help to ease the burden on the computer user.

Today, there are hundreds of vendors who offer trial versions ("demonstration copies") of software as a method of gaining inroads in the market place. A typical computer user may wish to evaluate demonstration copies of software programs by different vendors before making a decision to purchase the best program for a particular use. These demonstration copies, once downloaded and activated, will reside on the computer after any expiration date set therein unless deliberate efforts are made to remove them. Once a demonstration copy has expired, it will not be useful to a computer user and will only take up valuable storage space on the user's computer. A typical computer user must plod through all directories in the computer to identify the unusable or unwanted computer programs and remove them in a careful manner. To perform such task manually is not an optimal use of the time of a typical user. Additionally, in a manual cleanup of unusable or unwanted computer programs, there is a danger of deleting critical or useful programs accidentally, thus rendering the computer inoperative. Thus, there has developed a need for an accounting of software that is functional and useful and that which is unusable and merely occupying storage space on the computer.

To overcome some difficulties in removing outdated software programs from a user's computers, some vendors have started to market software programs like TuneUp™ to perform these tasks automatically. However, because of changes in the releases of operating systems, or the addition of new features, newer versions of such programs are released often. This creates a situation where a user must purchase and upgrade the previous versions of the "tuneup" programs. Accordingly, there is a need for an automatic method and system to cleanup a computer storage without the need to purchase newer versions of cleanup software. It is beneficial to a user if such cleanup happens without the user's intervention, and during the times when the user does not attend to the computer.

Another problem faced by a computer user is prompt notification that a new upgraded version of software is available. In the past, vendors have developed different ways to notify their customers. One method is to place a new advertisement banner indicating a new product or offering on other web sites and lead users to the advertiser's web site. But not many customers respond to such Internet invitations to click on an advertisement banner. Another way is to post a "What's New" page on a vendor's web site with links to other pages containing detailed information. This does not work well because this requires users to visit the vendor's web site periodically looking for new information. A third way is to maintain lists of electronic mail addresses for interested customers and send them e-mail notification periodically. Maintenance of these lists has proved to be tedious. Additionally, many customers object to receiving unsolicited electronic missives.

In order to automatically update information in a personal computer via the Internet, a new technology, called the "push" technology, has emerged. This technology incorporates the broadcasting model into web servers and browsers. The primary purpose of this technology is to overcome the problem of ensuring that interested parties are notified whenever information content in a web site is updated. "Content" is distinguished from other kinds of electronic information, such as programs and electronic mail messages in that content is the subject matter contained in a newspaper, a Lexis/Nexis™ database or the like. Content is neither a machine to perform a task nor a structure or description of how data are arranged in a computer. The push technology has helped corporations tailor their sites for particular groups of users so that interesting content is easily located. The push technology also has enabled messages to be sent to the audiences when it was deemed ready for publication. Using push publishing, web site publishers have delivered newsletters to niche audiences or notified subsets of their readers of updated content.

PointCast™ was one of the earliest implementations of the push technology to deliver information content. A user is typically advised to specify the type of content—news, entertainment, sports, or interest group related information-to be downloaded as it is updated. When upgraded content is available, the user may elect to download the information which can be browsed locally at the user's computer. Point-Cast™, however, is configured only to deliver content to the browser of a computer over the Internet. It is not designed or equipped with the means to download executable programs to a storage device connected to a computer and execute them at the remote computer.

Other products are aimed at delivering executable computer programs to a user computer and executing them locally. Oil Change™ is such a product. Once installed on the user computer, it allows automatic updating of computer programs via the Internet. In the case of Oil Change™, a user can update to new versions of previously purchased and loaded software, or download a new "patch" or a bugfix, device drivers for new peripheral devices, templates, clip art and business forms to work in conjunction with word processing software packages, screen saver images, or the latest amendments to the tax code to work with accounting software packages. Another example of a similar commercially available product is Castane™ from Marimba, Inc. In these systems, a user is required to download executable software programs from the vendor's web site via the Internet using a variant of a protocol called the File Transfer Protocol ("ftp"), and manually execute the downloaded programs on the user's personal computer thereafter. This mechanism is similar to loading software from a store-bought portable storage medium, such as a magnetic tape, a floppy disk or a CD ROM and running the software locally on a user's computer, except that the program is downloaded from the Internet instead of being loaded from a storage device.

Executing software on a 32-bit personal computer running a Windows-95 ®/98® or NT® operating system involves registering the software in a data store called Windows Registry. Windows Registry is a configuration data store for both hardware and software. The settings in Windows Registry control the behavior of the software. When a user attempts to execute software on a personal computer equipped with the above-mentioned operating systems, the operating system interprets the user's attempt and runs the software based exclusively on the information from the Windows Registry. Typically, an entry in Windows® Registry is made during the installation process of new software on a computer. Vendors of software application programs provide automatic means to ensure proper installation of their programs. If, on the other hand, no entry is made in the Windows® Registry, the context under which a user used the software is lost. There is a need, therefore, for a system and method to store the information related to the context of software usage without using the Windows® Registry as a repository of such information.

The programming language Java™ contemplates a virtual machine called the Java Virtual Machine™ (JVM) to run compiled Java™ code and stand-alone programs called "applets," after they are downloaded to a compatible web browser such as the Netscape® Navigator™, in a tightly controlled and secure environment. The JVM™ is a software implementation of a central processing unit (CPU), an essential component in every computer. Software written in this virtual machine methodology run within a contained environment defined to work only in a browser program and cannot access a client computer's file system or desktop easily.

Other programming methodologies, such as the Component Object Model (COM) have been developed to overcome this deficiency. However, this does not solve all the problems with delivering executable software to a client computer over the Internet in a form ready to be automatically executed. There is a need, therefore, for a method to encapsulate software as to make it executable automatically upon delivery to the client computer.

Users of personal computers do not wish to entrust access to their computers to an unknown remotely located entity, for fear of losing privacy or causing damage to data stored in their computers. A service offered by a trustworthy source such as McAfee Associates, Inc., a well known vendor of computer security software, will overcome the user reluctance to allowing access of their personal computers to a remote operator.

In summary, the state of the art provides means to deliver components of programs, means to deliver executable programs that must be executed locally by manual intervention, and means to provide content rather than executable programs. This art can be improved by delivering executable software rather than mere components to a personal computer; by allowing a trusted remote operator to access the internal components of a personal computer; and by executing programs automatically from a remote location. There is a need, for example, for a system and method in which when a user connects with a web site, an application may be downloaded, installed, registered and executed without any further intervention on the part of the user.

Section B

The public data networks, collectively called the Internet and colloquially referred to as the Web, are becoming increasingly popular. Among other things, the Internet provides a communication medium to distribute software products to computers that are located at distant places. The numerous methods by which sellers of computer software programs deliver executable programs automatically to client computers owned or operated by users are described herein and in the parent application, the disclosure of which is hereby incorporated by reference.

To understand the invention, it is helpful to understand the distinctions among the terms content, browser, type-setting program, embedded object and script. These five types of entities are described below in the context of Internet-related software.

Content is the subject matter contained in a web page. Content is distinguished from the other entities described herein in that content is not a program; it is the data that is presented to a user.

A web browser, or simply, a browser, is a computer program that provides access to the vast resources of the Internet. Typically, this is done by providing a "window" to the data located on other computers connected to the Internet. A frame is a part or section of a browser window that contains a distinct display area. If a web page is defined to contain multiple frames, each frame can act as an independent display area, and can download web pages located at different web sites, while displaying them together in one window on a browser. Alternatively, a web page may cause multiple browser windows to be created on the user's computer. A browser can also be described as a "container" of the various components it displays. Thus, while the components are embedded in a browser, the browser envelops the components.

In general, in a window-based computer system, such as the Windows™ 98™ program marketed by the Microsoft Corporation, windows are arranged hierarchically. A browser program that executes on a window-based computer system is also arranged hierarchically. When a browser application is launched on a windows-based computer system, the first window that appears is called "parent window" or "main window" or "top-level" window. This top-level window can later "spawn" or "fork" other windows, which are called "sub-windows" that run other applications. A sub-window may be created by executing a script within a browser window, and may be programmed to run another instance of a browser program. In such cases, the sub-window is called an "opener" window. Thus, it may be the case that a first window running a browser program—a top-level window—is programmed to point to a web site, and a sub-window created from the same browser program is programmed to point to a different web site.

A type-setting program is a presentation program, typically written in the Hyper Text Markup Language (HTML). In an HTML-encoded program, content is surrounded by codes that indicate the manner in which the browser presents the content to a user. Additionally, HTML encodes certain devices called "links" that allow a user to "navigate" the web by simply clicking on a sensitive area of the web page.

A document that contains "objects" or "components" like graphics, audio or video files, or charts in addition to text is called an embedded document object. Several competing standards exist in the marketplace for documents that can be transmitted over the Internet and displayed in a browser. For example, two such standards are OpenDoc, promoted by the International Business Machines Corporation and Object Linking and Embedding (OLE), promoted by the Microsoft Corporation. Typically, these standards provide for an application programming interface (API) that allows an independent software vendor (ISV) to develop applications that deliver components via the Internet. An API generally allows a programmer to interact with an enveloping browser. For example, a programmer may seek to determine the precise configuration of the browser by reading the values of its internal parameters. Alternatively, a programmer may wish to adapt the browser to a desired configuration by appropriately setting the browser's parameters.

Finally, a script is a list of computer-executable instructions, typically written in a human-readable language. Some browsers are configured to execute instructions written in script languages. In such browsers, an analog of a Central Processor Unit (CPU)—which is an essential component of all modern computers—is defined within the software contained in the browser. This software-defined CPU executes the scripts within the browser environment. For example, JavaScript™ is a language in which a programmer can code in a human-readable set of instructions that can be executed within the browser environment. In this case, the browser is said to be a "container" object to execute the script within its bounds.

Referring now to the parent application, to achieve the objective stated therein, a web browser program running on a client computer must be able to access the inner workings of the client computer. This can be achieved with the help of the OLE document object technology. The OLE technology is a "system-level object architecture that includes services for all-inclusive data access, remote distribution of software components across heterogeneous platforms, robust transaction processing, and large-group development." ActiveX™ technology, developed by the Microsoft Corporation, of Redmond, Wash., uses the OLE architecture and provides the building blocks that enable a provider to distribute over a network software executables that can be executed on a client machine. In general, such distribution of software executables is done via a web browser as described in the parent application. Typically, this execution on a client machine is done when a page source is input to it by invoking certain scripts embedded in the web browser. The downloaded software components are called ActiveX™ controls, which are computer executable pieces of program code. One feature of ActiveX™ controls is that they have no restrictions placed on them once they reach a user's machine. For example, a programmer may write an ActiveX™ control that, upon downloading to a user's computer, can shut down the computer or reformat its hard drive thereby destroying all data stored on the computer. This creates an easy way for malicious programs such as viruses to reach the client computer and be executed without the user's notice.

To overcome these security problems, the Microsoft Corporation requires all ActiveX™ controls to be verified by a signature initiative called Authenticode. This verification works in the following way. Each ActiveX™ control is given a secure and encrypted digital signature by a trusted corporation. All browsers that allow download and execution of ActiveX controls are pre-programmed to verify the digital signature. Every time an ActiveX™ control is about to be downloaded, the browser examines the digital signature associated with the control. If the signature is verified as authentic by the browser, it is downloaded without any problems. Otherwise, the browser issues a warning message to the user.

As explained in the parent application, the invention described therein uses some of the features of a programming methodology exemplified by ActiveX™ to effect easy and "hands-free" automatic downloading of software executables to a user's computer without any action taken on the part of the user. While the invented method and system help achieve the stated ends, a security threat may be created because of the above-mentioned feature of the ActiveX-like technologies that allows unrestricted access by the embedded code to a user's computer.

Because computers today are interconnected by networks such as the Internet, computer security has become a more important issue than before. Today, computers are more prone to attacks by viruses and Trojan Horses. A virus is a piece of computer code that replicates itself without a user's intervention. Left unchecked, a virus may copy itself stealthily to other computers and corrupt the data stored in storage devices connected to the computers. For example, a virus may rewrite a section of a computer start-up program called the "boot sector". Every time a computer is started, the virus copies itself into the memory of the computer and waits. Suppose a user wishes to copy some data from the computer to a portable medium such as a floppy disk. The virus that has copied itself to the memory could be programmed to intercept the writing of the data to the disk and copy itself to the disk along with the data. In this manner, the virus has replicated itself to the floppy disk and is now ready to infect other computers where the floppy disk is used.

In contrast to a computer virus, a "Trojan Horse" is a malicious computer program that—like the fabled instrument of war used by ancient Greeks to gain entry into Troy—causes a user to believe that it is a legitimate program and entices the user operating a computer to perform certain actions that lead to compromising the security of the data stored in the computer.

Referring back to the parent application, assume that in accordance with the invention described therein, an Internet Clinical Services Provider (ICSP) downloads a software program called QuickClean™, designed to "cleanup" the user's hard drive. In accordance with the above-mentioned ActiveX™ Authenticode initiative, a license file is delivered to the user along with the QuickClean program. This software is designed with embedded methods or sub-routines that, when invoked properly using a script, rid the user computer of unwanted or unused software in an orderly manner. However, since these methods or sub-routines for removing unwanted or unused software are invoked by a script, a malicious user can also invoke the script in such a way as to remove desirable or valuable software, thereby causing severe damage to the user's computer. Moreover, a malicious user may also attempt to secretly transfer the contents of a user's computer by e-mailing these to his own computer. In the computer security lingo, such a malicious user or programmer is called a computer "hacker." The above-mentioned malicious act, called computer "hacking," can be accomplished in two ways.

In accordance with a first way of hacking, a hacker obtains a legitimate copy of QuickClean™ and its associated license file from the ICSP. The hacker can then create his own web site and host both QuickClean™ and the associated Authenticode license file on his web site and invite others to use the "free" software. The hacker creates a web page on his web site that contains a malicious script that will use the methods or sub-routines in the QuickClean™ program to erase a user's hard disk. When a user, enticed by the "free" software downloads the web page from the hacker's web site, the hacker will download the QuickClean™ program to the user's computer and invoke the methods in the program to erase the user's hard disk. Alternatively, suppose a user visits an authorized ICSP web site first and downloads the QuickClean™ program along with the associated Authenticode license file. Later, the user visits the hacker's web site. Since the QuickClean™ program is already stored on the user's computer, the hacker does not need to obtain a legitimate copy to wreak havoc on a user's computer by providing a script to invoke the sub-routines embedded in the QuickClean™ program.

In accordance with a second way of hacking, a hacker may entice an unsuspecting user to visit his web site. The hacker may program his web pages to invoke multiple frames or multiple browser windows. In one frame or browser window, the hacker can cause the user computer to download the QuickClean™ program and the associated license file from the ICSP web site. In a second frame or browser window, the hacker can run his malicious script, thereby causing damage as described above.

There is a need, therefore, for a system and method to prevent a hacker from activating the methods or sub-routines embedded in a computer executable code downloaded to a user computer via the web.

SUMMARY OF THE INVENTION

A method and computer executable program code are disclosed for performing one or more maintenance tasks on a remotely located computer connected to a server computer via a data network.

DESCRIPTION OF THE DRAWINGS

These and other objects, features and advantages of the invention will be more readily apparent from the following detailed description of a preferred embodiment in which:

FIGS. 4-1 and 4-2 are a flow chart depicting operation of an embodiment of the present invention;

DETAILED DESCRIPTION OF THE PREFERRED EMBODIMENTS

Figure 1:
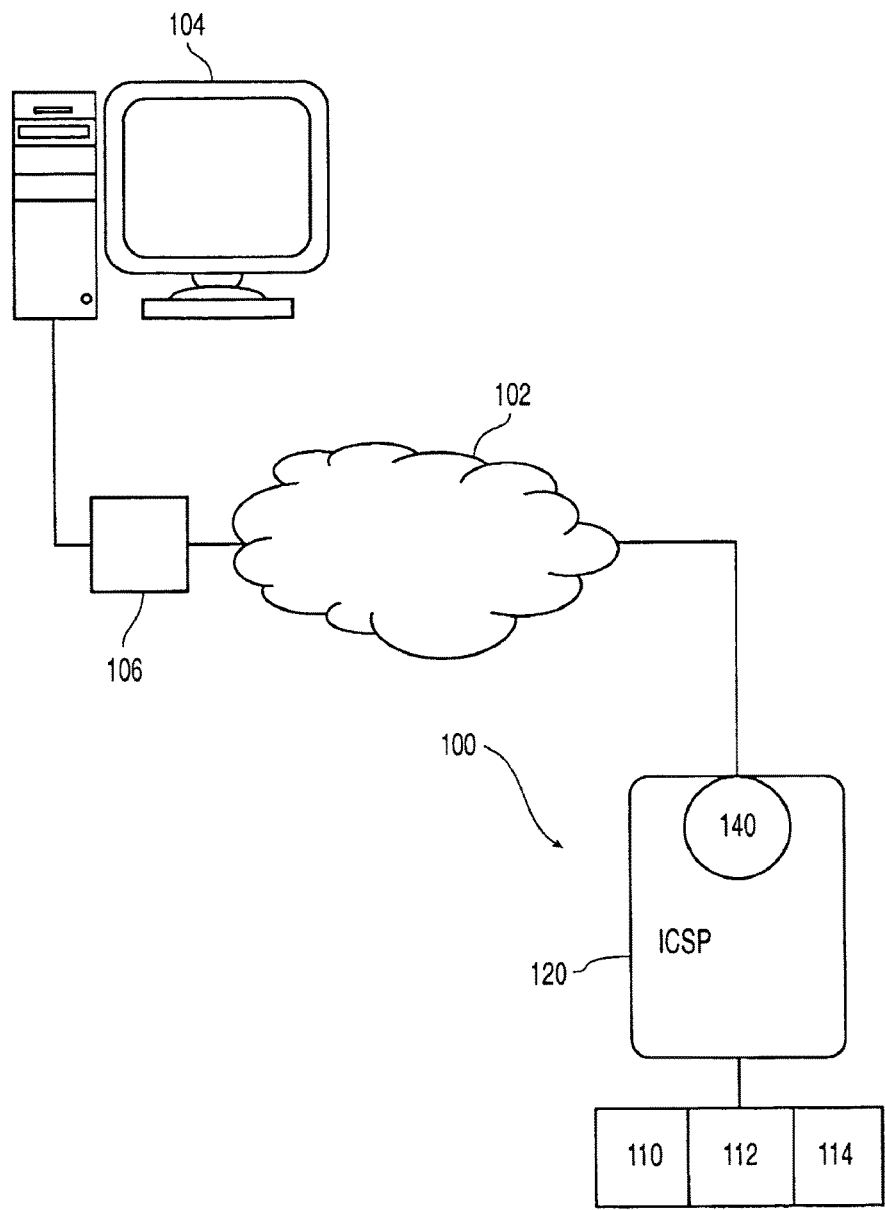
FIG. 1 depicts the overall architecture of an embodiment of the present invention comprising a server computer and a user computer connected via a data network.

Referring to the drawings, wherein like reference numbers refer to like parts, FIG. 1 illustrates one embodiment of the invention. An Internet clinical services provider ("ICSP") maintains and controls a server computer 100, which is connected to a data communication network, such as a Local Area Network, a Wide Area Network or other similar network. In a preferred embodiment as shown in FIG. 1, the data communication network is the Internet 102. The server computer 100 is equipped with storage 110, memory 112, and a network interface device 114 to connect to the Internet 102. The server computer 100 makes available information that can be accessed via Internet 102 by user computer 104 using a browser. User computer 104 is connected to the Internet 102 via a modem 106. The user computer 104 is equipped with a semiconductor memory, a storage device such as a disk drive, a central processing unit such as a Pentium™, Pentium II™, or Motorola 68000 microprocessor, and a display device such as a CRT. Additionally, the user computer 104 is equipped with software that enables the user to connect to the Internet 102 via the modem 106 as well as a browser 116 (shown in FIG. 2) that allows the user to "surf" the Internet 102.

Figure 2:
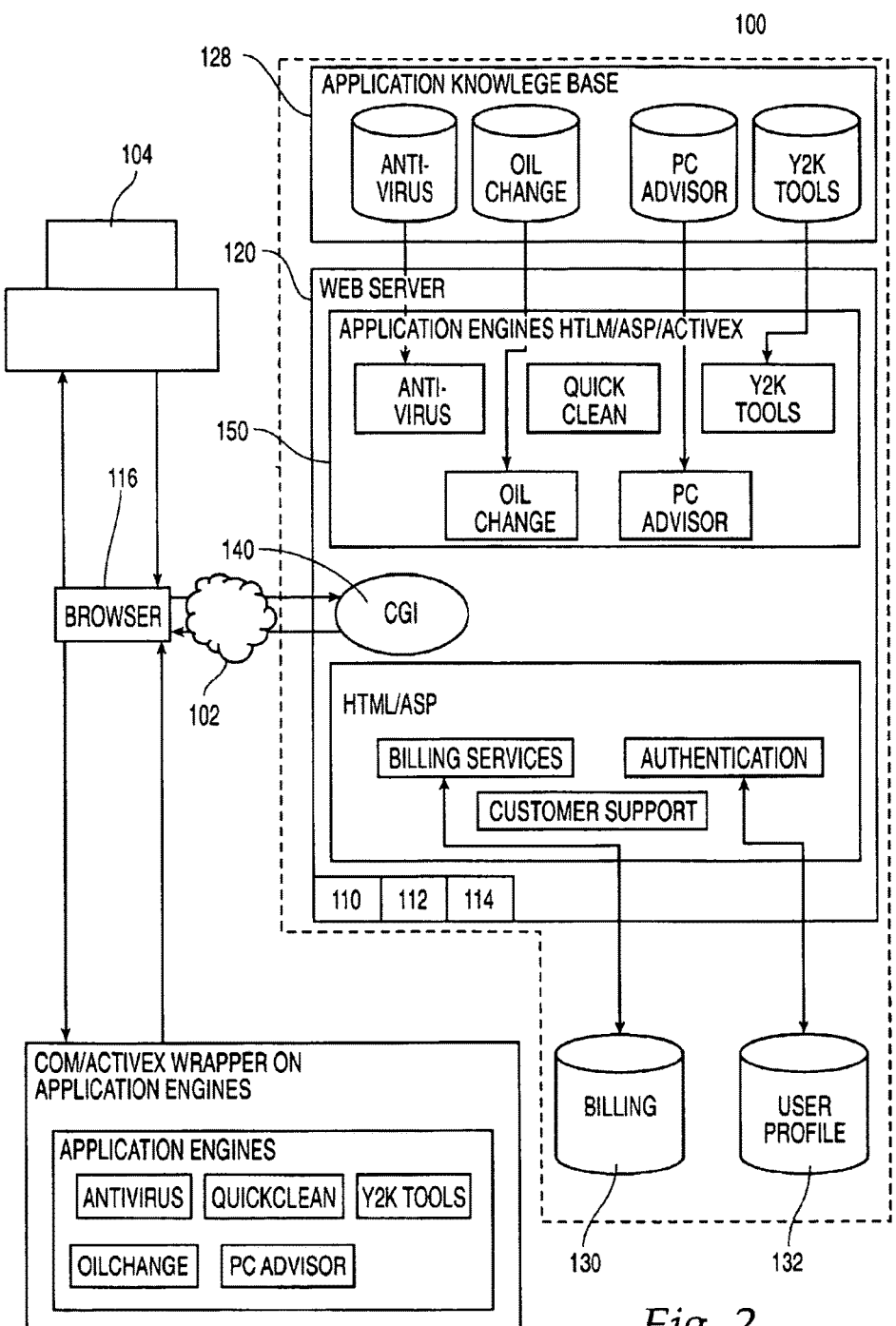
FIG. 2 is a detailed view of the component parts of an embodiment of the present invention.

Now referring to FIG. 2, in a preferred embodiment the server computer 100 comprises web server software 120, and is coupled to server-side engines 150 to deliver Hyper Text Markup Language (HTML), Microsoft® Active Server Pages™ (ASP), and ActiveX™.

Also on the server computer 100, a Common Gateway Interface (CGI) program 140 provides the software interconnection between the Internet 102 and other programs running on the server computer 100. Typically, the CGI program 140 forms the gateway to the Internet 102 by opening a connection via a Transport Control Protocol/Internet Protocol (TCP/IP) stack. All requests enter the server computer 100 via the CGI program 140, and all responses are delivered to the user computer 104 via the Internet 102 by way of the CGI program 140.

In a preferred embodiment, the server-side engine 150 software is implemented in the programming language ActiveX™ marketed by the Microsoft Corporation, of Redmond, Wash. ActiveX™ is a set of technologies that enables software components to interact with one another in a networked environment, regardless of the language in which they were created. ActiveX™ is built on the Component Object Model (COM). An ActiveX™ control is an object created using the ActiveX™ technology.

The server-side engines 150 are information delivery systems that respond to an Internet request for a particular type of service. A user makes an Internet request for service typically by typing a Universal Resource Locator (URL) in the web browser 116 running on the user computer 104, and submitting it in the form of a packet of data to the server computer 100. Thus, the user computer establishes a logical connection with the server computer. When the user computer 104 requests an ActiveX™ service, the server-side ActiveX™ engine 150 delivers corresponding objects called "ActiveX™ controls" and accompanying script files, embedded in a HTML file, to the user computer 104. ActiveX™ controls are programming building blocks that enable small component parts of software to be embedded in a HTML page 500 and sent to the client computer 104 in response to a user request. A more detailed explanation of the workings of the ActiveX™ controls and the method by which they are delivered to a user computer is provided in the book, "Understanding ActiveX™ and OLE™," by David Chappell, Microsoft® Press, Washington, 1996, which is incorporated herein by reference. One of ordinary skill in the art will recognize that ActiveX™ controls could easily be substituted with other similar mechanisms without undue experimentation if a Java™-enabled browser or any other browser provides a mechanism to access the inner workings of the user computer 104.

Also connected to the server computer 100 is an application knowledge base 128, which is a repository of data pertaining to the various software that are delivered to the client computer 104 by the server-side engines 150. The data stored by the application knowledge base 128 typically relates to the specific characteristics of an executable software program. For example, if a new version of an anti-virus program is available, then the knowledge base stores the changed programs or dynamic link libraries (DLL) of the new version. Before the server-side engines 150 download software to the user computer 104, they consult with the knowledge base and determine that an upgrade is needed for the user computer 104.

The server computer 100 is additionally connected to a billing database 130 and a user profile database 132. The billing database 130 stores the information related to any user requests for services offered by the ICSP; the user profile database 132 enables storage, update, and retrieval of any user-related information, such as name, contact address, telephone number and e-mail address. In a preferred embodiment, both the billing database 130 and the user profile database 132 are implemented using a Microsoft® SQL Serve™ database system. In alternative embodiments, any indexing system, relational database management system, flat files or other data storage and retrieval mechanism can be used. The billing database 130 and the user profile database 132 provide interfaces that enable a server-side engine to request pertinent information in the form of a database query-response interaction method, such as the Structured Query Language (SQL) method.

It is to be appreciated that, in accordance with a preferred embodiment, an account for the user may be created on the server computer before or during the registration step. Generally speaking, this will include the steps of taking a customer credit card number or receiving other funds from the customer, and adding funds to the account. Each time the user uses the services of the ICSP, the account may be debited. Alternatively, the account need not be debited every time the user uses the services of the ICSP, but rather the ICSP services may be offered on a subscription basis, wherein the customer may purchases a subscription at the beginning of a time period (such as one year) and may then use the services of the ICSP as much as desired through the course of the time period.

Figure 3:
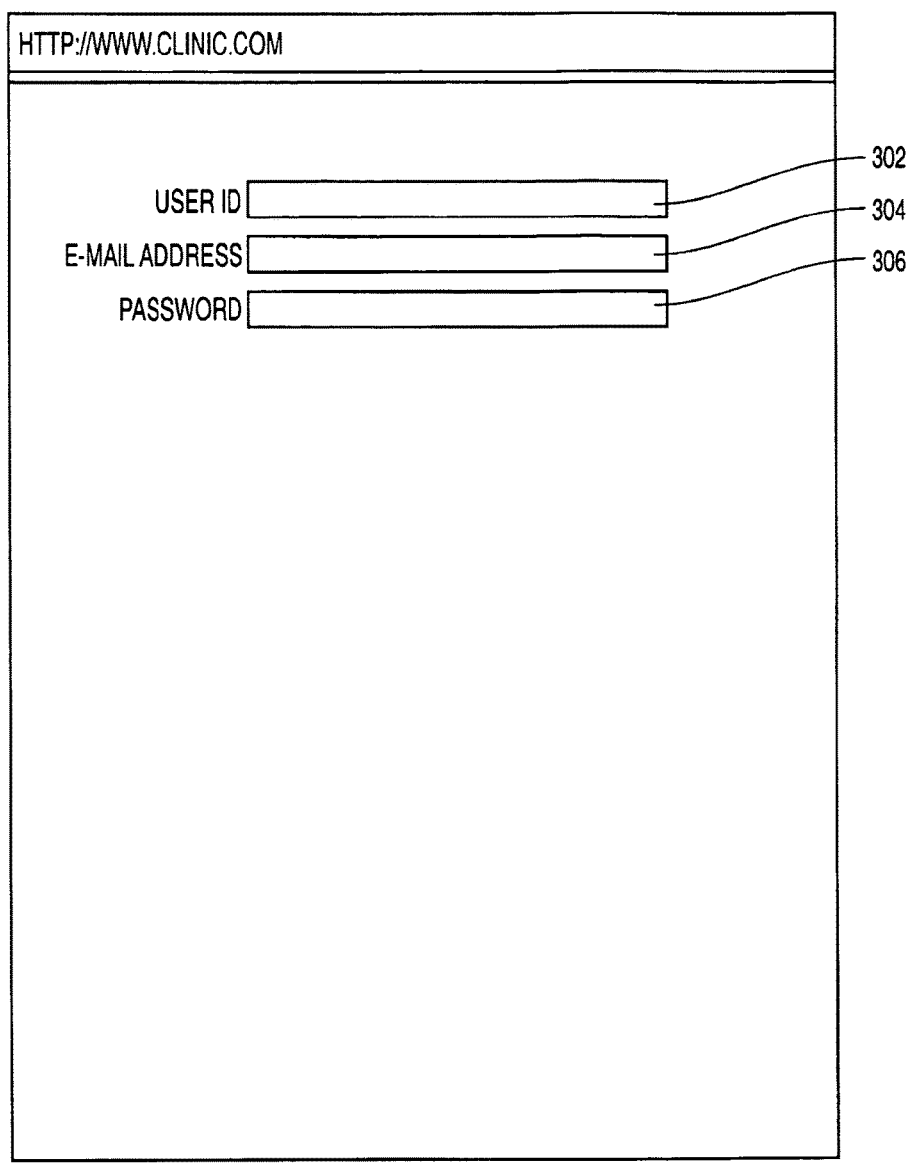
FIG. 3 is a sample web page depicting a user enrollment form.
Figures 1, 4:
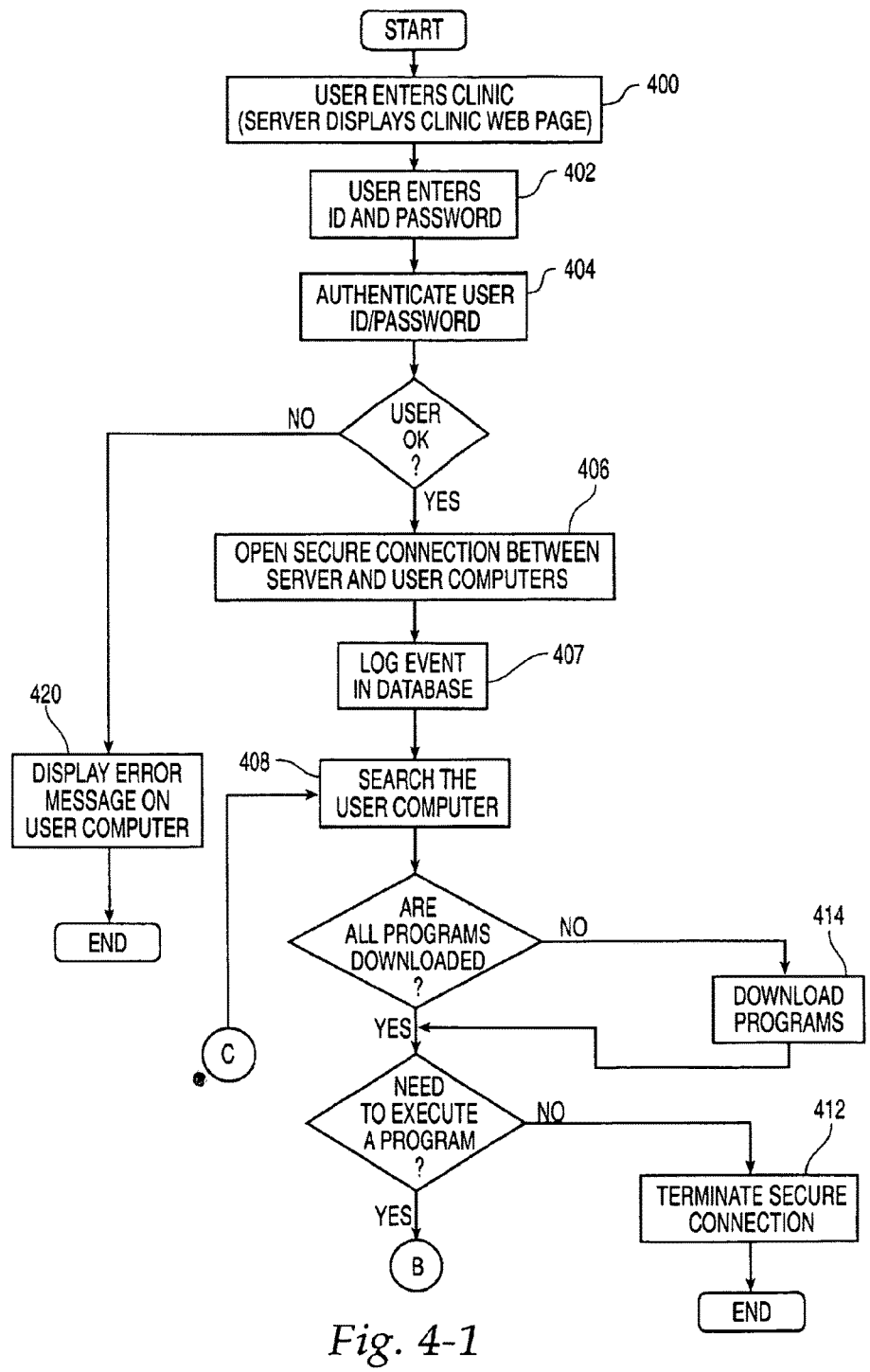
Figures 2, 4:
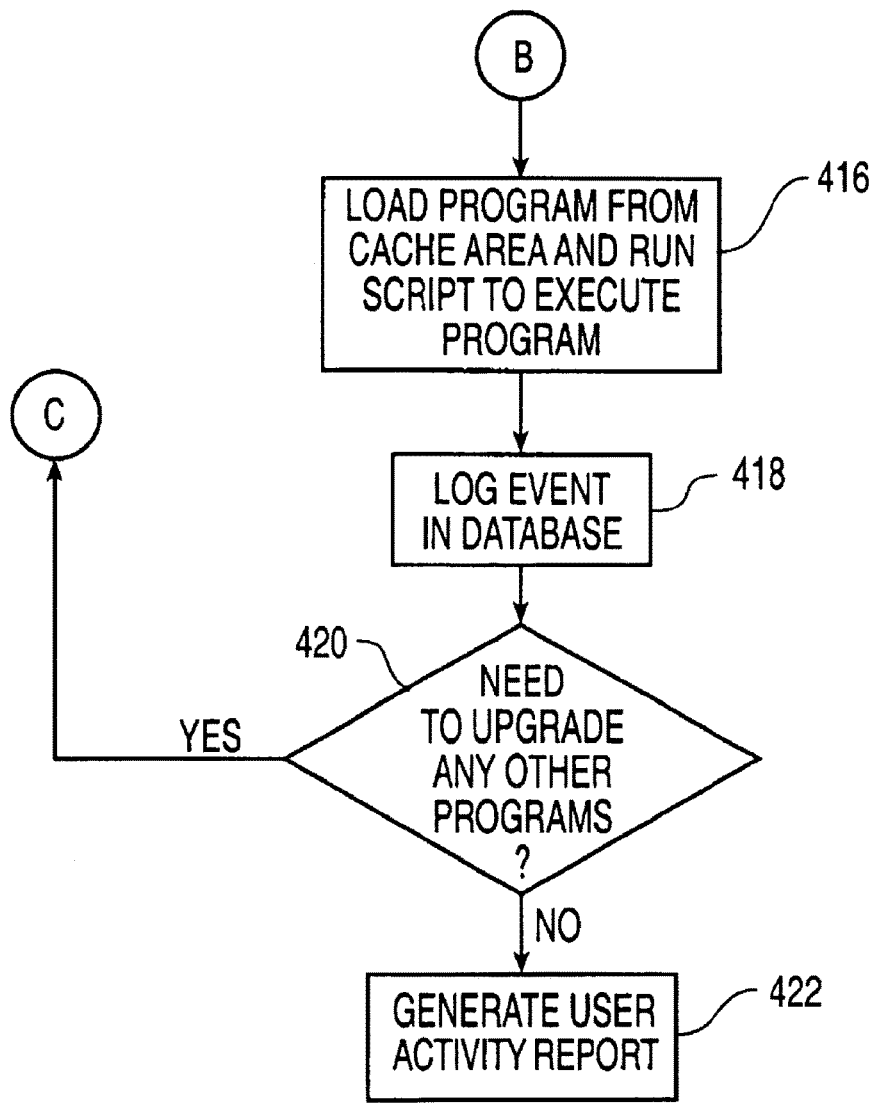

Illustrative operation of the invention is described in conjunction with FIGS. 3-4. A user at a personal computer such as computer 104 accesses the ICSP by typing the URL for the "clinic" web page 300. This causes browser 116 to access the server computer 100, thereby establishing a logical connection with the server computer. The server computer 100 then responds to the user request by sending web page 300, preferably a home page for the ICSP service, to user computer 104 for display. The web page 300 contains fields for an identification number 302, a user's e-mail address 304, and optionally, a web password 306. The user enters the user identification information in the web page 300 and sends the page to the server computer 100 (step 402). The CGI program 140 running on the server computer 100 receives the user identification information and performs a lookup in the user profile database 132 to authenticate the user (step 404). If the user is not authenticated, the CGI program 140 sends an error message to the user computer 104 in the form of a web page (step 420). If, on the other hand, the user is authenticated, the CGI program 140 on the server computer 100 creates a secured connection between the user computer 104 and the server computer 100 (step 406). This process, of authenticating the user computer 104 and creating a secured connection between the two computers 100 and 104, is called "registering" the user computer 104 with the ICSP. The act of registering the user computer 104 at the server computer 100 web site causes the user computer 104 to allow the server computer 100 to run scripts to start applications.

An "event" is an action performed by a user or by the server computer 100. For example, registering a user computer 104 at the ICSP web site is an event. Similarly, the occurrence of a timeout condition, the automatic downloading of an anti-virus program to the user computer 104, or the termination of the secure connection, are events caused by the server computer 100. A "transaction" is defined as a set of events that occur between the registration of the user computer 104 at the ICSP web site and the completion of the actions by the server computer 100 or the termination of the connection established between the two computers. After the user computer 104 is registered at the ICSP, entries are made in the billing database 130 and the user profile database 132 for the event (step 407).

The CGI program running on the server computer 100 causes a web page to be downloaded to the user computer 104. Embedded in the web page are ActiveX™ controls and scripts that cause a search program to be executed on the user computer 104 to determine if any executable software needs execution, installation, upgrades or updates (step 408). In a preferred embodiment, this results in a search of the user computer's storage medium, for example, in the cache area of the browser 116, to determine if any program needs to be downloaded. Additionally, the program looks to determine if there is a need to execute any software program, such as an anti-virus program (step 410). If no execution, installation, upgrades or updates are needed, then the connection between the server computer 100 and the user computer 104 is terminated (step 412).

If, on the other hand, an execution, installation, upgrade or update is determined to be needed, the server computer 100 then proceeds to download new executable software to the user computer 104 via the Internet 102 connection (step 414), or to execute previously downloaded software(step 416). In a preferred embodiment, the server computer 100 downloads an application engine by wrapping it in a COM/ActiveX wrapper and storing the entire package in a browser cache area of the client computer 104.

These application engines are configured to perform different tasks or a combination of different tasks. These tasks include, but are not limited to, checking for any computer viruses on the user computer 104; compressing the software or data located on the storage connected to the user computer 104; searching for software or data on the user computer 104 that needs upgraded versions; upgrading the software or data on the user computer 104; searching for and deleting unused, obsolete, unneeded or undesired software, components or data on the user computer 104; archiving software or data located on the user computer 104; shredding or deleting without trace the data or software located on the user computer; advising or responding to user questions as an expert advisor system; performing hardware and software diagnostics on the user computer 104; and providing a health report card for the user computer 104. It should be noted that a person skilled in the art may download software to accomplish other tasks in a similar manner. Accordingly, the scope of the present invention encompasses that as well.

After the server computer 100 downloads a program to the user computer 104 (according to step 414), the server computer 100 automatically executes the program on the user computer 104 without any intervention by the user (step 416). The details of the execution of the downloaded program are recorded in the database 130 and the user profile database 132 connected to the server computer 100 (step 418).

After the application is executed on the user computer 104, the server computer 100 checks if any other programs need to be downloaded or upgraded on the client computer 104 (step 420). If other programs are to be downloaded or executed, then the server computer 100 performs steps 408-416 without any further intervention by the user.

Upon the expiration of a time period set by the ICSP, or upon demand, a report is generated by the server computer 100 of the transactions logged in the databases 132 and 130 (step 422). This report is either in a textual form summarizing different classes of transactions requested by users of the ICSP, or in a graphical form with two-or three-dimensional bar-graphs, stacked bar graphs, line graphs, or pie charts displaying statistical analyses of different operations performed by or with the server computer 100. Reports of the statistical analysis and graphs representing such analysis are then transmitted in an electronic form to the user computer 104.

Accordingly, using a method in accordance with the preferred embodiments, a relatively unsophisticated computer user who has an Internet browser such as Internet Explorer 4.0 or Netscape Communicator 4.0 installed on their computer system is capable of maintaining a secure, up-to-date, and optimized computer system without needing to manually perform the "sophisticated" steps of purchasing and installing software upgrades, optimization software, antivirus programs, etc. Rather, in a manner analogous to the way a car owner simply takes their car to a service garage and walk away while the car is "automatically" upgraded or repaired, a user in a system according to the preferred embodiments may simply "park" their computer at the ICSP using their Web browser and, after registration or other validation procedure, may simply "walk away" while their computer is automatically upgraded or repaired by encapsulated routines that are automatically downloaded from the ICSP.

The foregoing describes a new and useful method and system for automatically downloading and remotely executing software applications over a secure Internet 102 connection. Those skilled in the art may make numerous modifications and departures from the specific embodiments without departing from the spirit and scope of the claimed invention. For example, the server computer 100 can comprise a distributed computing system or a cluster of networked computers; the database may comprise a distributed database or several databases. Additionally, web pages may comprise an interface that is not specified herein. Other embodiments may include a network connection other than the Internet 102 between the server computer 100 and the user computer 104; and the software downloaded may be intended to perform tasks such as database management, word processing, spread sheet, games, or other tasks that are not specified herein.

Figure 5:
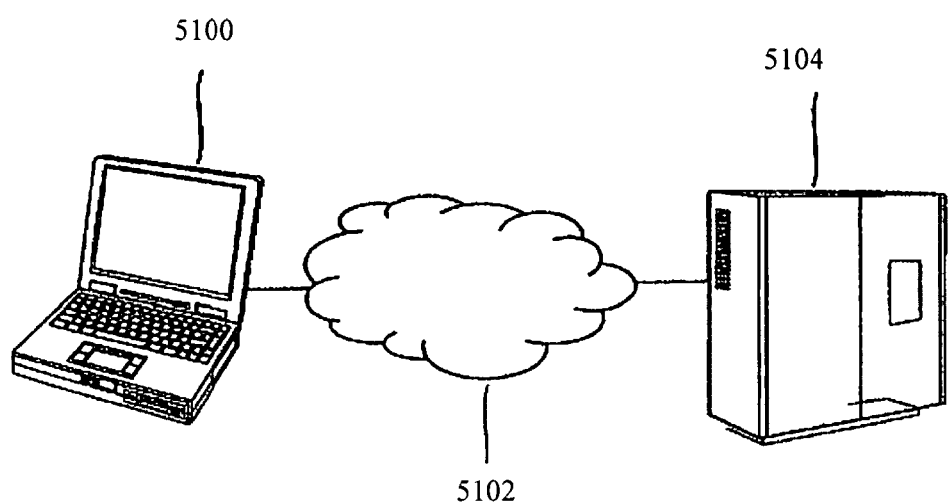
FIG. 5 shows a server computer connected to a client computer via the Internet.
Figure 6A:
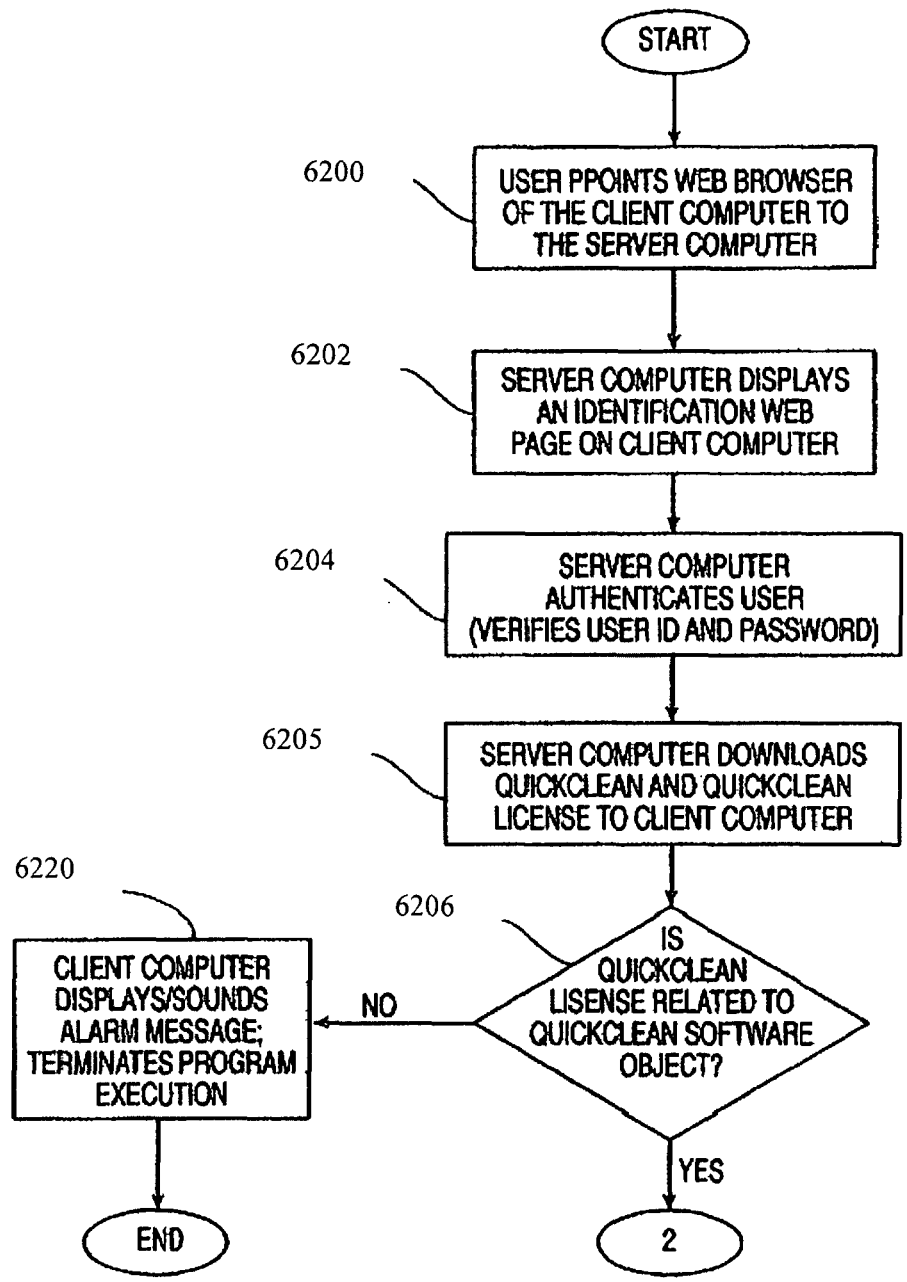
FIGS. 6A and 6B are a flow diagram depicting the steps comprising a preferred method to practice the invention.
Figure 6B:
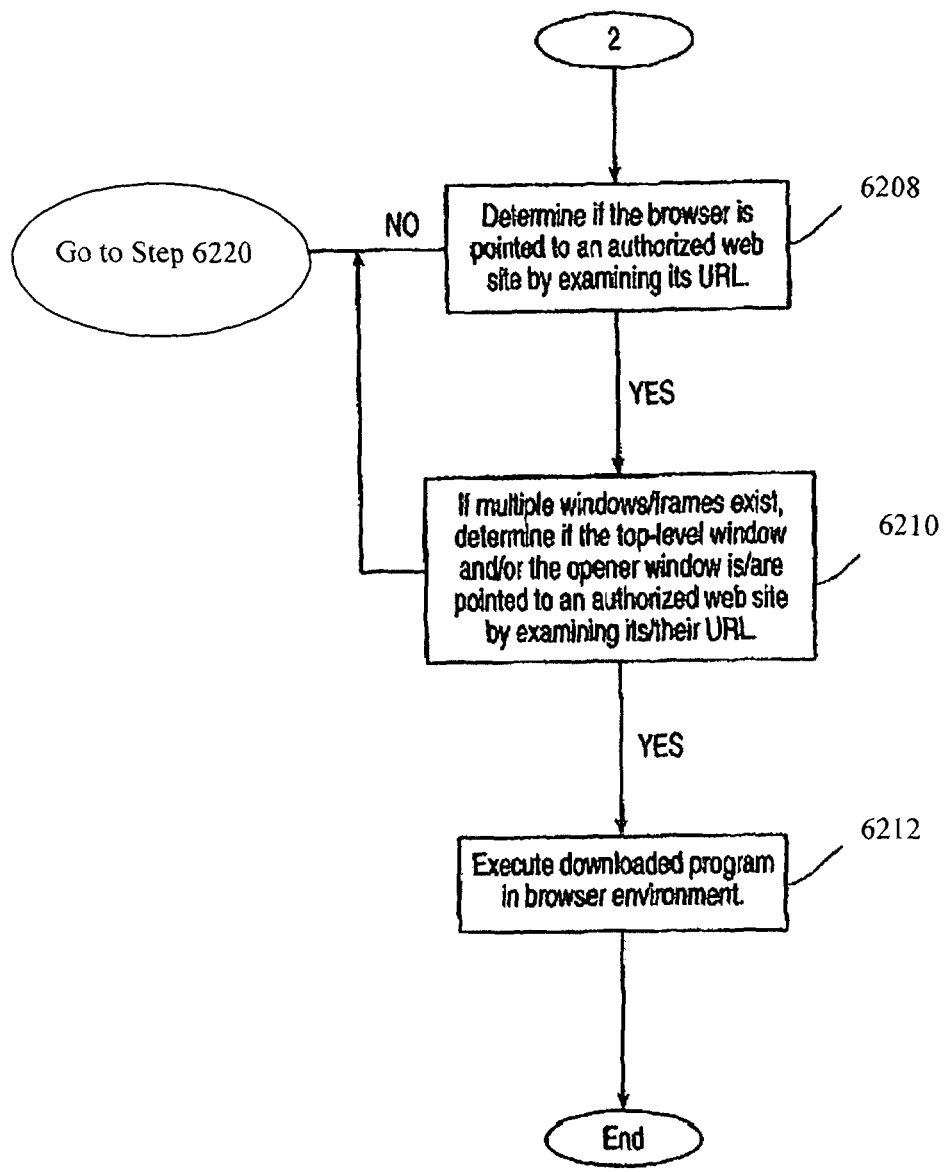

FIGS. 5-6B illustrate another embodiment. Referring to FIG. 5, a client computer 5100 is connected to the Internet 5102. Also connected to the Internet 5102 is a server computer 5104. The client computer 5100 can be a personal computer (PC), and is equipped with a processor, such as a Pentium II™ microprocessor, a display device such as a computer monitor or a flat panel display, a memory such as a semiconductor memory, an input device such as a computer keyboard or a mouse, and a storage device such as a computer hard drive. The client computer 5100 is configured to run an ActiveX™-compatible browser such as the Microsoft® Internet Explorer browser program. The browser program is adapted to incorporate an embedded object model, facilitating the delivery of objects by the server computer 5104 to the client computer 5100. Though in the preferred embodiment a Microsoft® Internet Explorer browser and the ActiveX™ technology are discussed, these should not be viewed as limitations to the invention. While in the illustrative discussion herein the technologies are enumerated as the best ways to practice the invention, the invention is contemplated to extend beyond these specific modes of implementation.

As described in the parent application, the server computer 5104 is operated by an Internet Clinical Services Provider (ICSP). The server computer 5104 comprises a processor, such as a Pentium II™ microprocessor, a memory such as a semiconductor memory, and a storage device such as a computer hard drive. The server computer 5104 is configured to receive request messages from the client computer 5100 over the internet in the Hyper Text Transfer Protocol (HTTP), File Transfer Protocol (FTP) or any similar protocol used to transfer data, video, voice or a combination of these media. The server computer 5104 is configured to transmit in response messages that include "web pages" that are programmed in Hyper Text Markup Language (HTML) or a similar language. Embedded in the web pages are components such as documents, scripts, objects, frames and others that enable the server computer 5104 to display colorful graphical images on the display device coupled to the client computer 5100.

Now referring to FIGS. 6A and 6B, in accordance with the invention described in the parent application, a user operating the client computer 5100 enters the Universal Resource Locator (URL) pertaining to the server computer 5104 in a window provided by the browser program running on the client computer 5100. When the user presses a "send" button on the browser, this causes a request message to be transmitted to the server computer 5104. (Step 6200). The server computer 5104 then causes an identification web page to be displayed on the browser window at the client computer 5100. After the user enters the appropriate identification information in the browser window, this information is transmitted to the server computer. (Step 6202).

The server computer 5104 authenticates the user (Step 6204), and if authenticated, proceeds to download a copy of an ActiveX™-control-like software program and an associated license file to the client computer 5100. (Step 6205). For the purposes of illustration, assume that the software program is QuickClean™ and the license file is named QuickCleanLicense. The license file works in conjunction with the software program in the following way. When software objects embedded in the software program are to be executed, the browser or another program running on the client computer 5100 verifies if the license file and the software objects are "related." If they are found to be related, the methods (or sub-routines) within the software objects can be "invoked" by a script running on the client computer 5100. (Step 6206). If, on the other hand, QuickCleanLicense is found to be not related to QuickClean software, then the client computer 5100 terminates the program after displaying or sounding an alarm message. (Step 6220). It should be noted that authentication of the user by the server computer 5104 (described in step 6204) and the verification of the software objects by the client computer 5100 (described in step 6206) are different tasks and should not be confused with each other.

The invented method adds an additional step to the art described in the parent application. After the client computer 5100 determines that the QuickClean™ software and the QuickCleanLicense are "related," the code in the QuickClean™ software must be "enabled" before it can be put to intended use. This is done by appropriately programming the QuickClean™ software to perform a "first-check" and a "second-check" as follows.

In order to prevent the first method of hacking described in this application, the QuickClean™ software is programmed to perform a "first-check" whereby it is determined if the browser is pointed to an ICSP-authorized web site when the software is invoked by the script running on the client computer. When the script invokes a sub-routine or a method in the QuickClean™ software, a first set of instructions embedded in the QuickClean™ software queries the browser to determine the URL to which the browser is pointed. (Step 6208 ).

A hacker may mislead the client computer 5100 when it performs the above-mentioned "first-check." He can do this by causing the client computer to open a new browser window or a new browser window frame, according to the second method of hacking described above. To prevent this, the following method is used to perform a "second-check" of the QuickClean™ software. This is accomplished by a second set of instructions embedded in the QuickClean software. The second set of instructions queries the browser to determine the URL pointed to by the "top-level" window and the "opener" window. (Step 6210).

For example, if ActiveX™ objects embedded in an OLE-compatible browser are used to implement the Quick-Clean™ program, the URL to which the browser is pointed can be obtained by calling the method GetDisplayName provided in the Monicker Interface or by calling the Get-Location method provided in the Service Provider Interface of the IOleClientSite object defined within the ActiveX™ object. If both the methods (or sub-routine calls) return the same result, which is a ICSP-authorized URL, then the QuickClean™ software is deemed to have passed the "first check." (Step 6208). These two methods can be illustrated as follows:

```
(1) IOleClientSite-->MonickerInterface-->GetDisplayName( )
(2) IOleClientSite-->ServiceProviderInterface-->BrowserAppInterface-->GetLocation( )
```

Additionally, the ActiveX objects embedded in the OLE-compatible browser can determine the URL pointed to by the "top-level" window of the browser by calling the BrowserApp Interface which can query the Document Object to obtain the HREF property of the Top Window Object. The "opener" window is determined in a similar manner. This can be illustrated in the following sequence of function calls:

```
(1) BrowserAppInterface-->DocumentObject-->WindowObject-->TopWindowObject--
>LocationInterface-->Href Property( ) = top-level URL
(2) BrowserAppInterface-->DocumentObject-->WindowObject-->TopWindowObject--
>OpenerWindowObject-->LocationInterface-->Href Property = opener URL
```

Once it is determined that the "top-level" URL and the "opener" URL point to the same authorized URL, then the QuickClean™ software is deemed "secondarily enabled." (Step 6210).

Upon a successful enablement according to steps 6208 and 6210, the QuickClean™ software is executed by scripts running on the client computer 5100. (Step 6212). If, on the other hand, the QuickClean™ software is not enabled according to steps 6208 or 6210, then an attempt by a script to run the software results in error messages. (Step 6220).

There is described in the foregoing a new and useful invention to prevent a hacker from causing a threat to the information contained in a client computer by misusing authenticated objects designed to perform secure tasks. One skilled in the art may make several modifications to or departures from the preferred embodiments provided herein without departing from the spirit and scope of the invention, or without undue experimentation. For example, the order in which steps 6208 and 6210 are executed may be interchanged; other browser programs can be used to practice the invention; and the technologies described herein to deliver and execute software via a computer network may be replaced with other similar technologies. All such departures and modifications are within the scope of this invention and should be construed accordingly.

What is claimed is:

1. At least one machine accessible storage medium having code stored thereon, the code when executed on a machine, to cause the machine to:

receive a download of software;
determine, from the download, a digital signature of the software;
determine, from the digital signature, whether the digital signature corresponds to a trusted source;
prevent unauthorized execution of the software by causing the machine to:
query a browser to determine whether a selected uniform resource locator (URL) to which the browser was pointed for the download of the software is authorized; and
based on determining that the selected URL is not authorized:
display a message indicating that the selected URL is not authorized when the software is invoked for installation; and
prevent installation of the software; and
based on determining that the selected URL is authorized:
install the software,
wherein determining whether to install the software is further based on whether the digital signature corresponds to the trusted source.

2. The storage medium of claim 1, wherein the digital signature is received with the download of the software.

3. The storage medium of claim 1, wherein the software is received from a server associated with the URL.

4. The storage medium of claim 1, wherein software is downloaded responsive to a user interaction with the browser.

5. The storage medium of claim 4, wherein the user interaction comprises a request to download the software.

6. The storage medium of claim 1, wherein the code, when executed, is to further cause the machine to receive data to describe a license of the software.

7. The storage medium of claim 1, wherein the browser is hosted on a personal computing device.

8. The storage medium of claim 1, wherein the software is received over the Internet.

9. The storage medium of claim 1, wherein the software comprises security software.

10. A method comprising:
receiving a download of software;
determining, from the download, a digital signature of the software;
determining, from the digital signature, whether the digital signature corresponds to a trusted source;
preventing unauthorized execution of the software by:
querying a browser to determine whether a selected uniform resource locator (URL) to which the browser was pointed for download of the software is authorized; and
based on determining that the selected URL is not authorized:
displaying a message indicating that the selected URL is not authorized when the software is invoked for installation; and
preventing installation of the software; and
based on determining that the selected URL is authorized:
installing the software,
wherein determining whether to install the software is further based on whether the digital signature corresponds to the trusted source.

11. The method of claim 10, wherein the URL corresponds to a server of the software.

12. The method of claim 10, wherein the URL is selected through the browser based on a user interaction with the browser.

13. A system comprising:
at least one processing apparatus;
at least one memory element;
a client to:
receive a download of software;
determine, from the download, a digital signature of the software;
determine, from the digital signature, whether the digital signature corresponds to a trusted source;
prevent unauthorized execution of the software, wherein the client is to:
query a browser to determine whether a selected uniform resource locator (URL) to which the browser was pointed for download of the software is authorized; and
based on determining that the selected URL is not authorized:
display a message indicating that the selected URL is not authorized when the software is invoked for installation; and
prevent installation of the software; and
based on determining that the selected URL is authorized:
install the software,
wherein determining whether to install the software is further based on whether the digital signature corresponds to the trusted source.

14. The system of claim 13, wherein the software is received over the Internet based on a user-initiated action.

15. The system of claim 14, further comprising the browser.

16. The system of claim 13, further comprising a particular server associated with an authorized URL.

17. The system of claim 16, wherein the particular server hosts a plurality of different software applications for download.

18. The storage medium of claim 1, wherein the selected URL is a first URL, and wherein the code is further to cause the machine to:
query the browser to determine a second URL associated with a browser window that caused the browser to point to the first URL, wherein determining whether to install the software is further based on whether the first URL is the same as the second URL.

19. The method of claim 10, wherein the selected URL is a first URL, and further comprising:
querying the browser to determine a second URL associated with a browser window that caused the browser to point to the first URL, wherein determining whether to install the software is further based on whether the first URL is the same as the second URL.

20. The system of claim 16, wherein the selected URL is a first URL, and wherein the client is to:
query the browser to determine a second URL associated with a browser window that caused the browser to point to the first URL, wherein determining whether to install the software is further based on whether the first URL is the same as the second URL.

* * * * *

UNITED STATES PATENT AND TRADEMARK OFFICE
CERTIFICATE OF CORRECTION

PATENT NO. : 10,021,112 B2  
APPLICATION NO. : 14/583573  
DATED : July 10, 2018  
INVENTOR(S) : Balasubramaniam et al.

Page 1 of 1

It is certified that error appears in the above-identified patent and that said Letters Patent is hereby corrected as shown below:

In the Drawings

On sheet 2 of 8, in FIG. 2, Line 1, Reference Numeral 128, delete "KNOWLEGE" and insert -- KNOWLEDGE --, therefor.

On sheet 2 of 8, in FIG. 2, Line 1, Reference Numeral 150, delete "HTLM/ASP/ACTIVEX" and insert -- HTML/ASP/ACTIVEX --, therefor.

On sheet 2 of 8, in FIG. 2, Line 27 (approx), delete "OILCHANGE" and insert -- OIL CHANGE --, therefor.

On sheet 7 of 8, in FIG. 6A, Line 1, Reference Numeral 6200, delete "PPOINTS" and insert -- POINTS --, therefor.

On sheet 7 of 8, in FIG. 6A, Line 3, Reference Numeral 6206, delete "LISENSE" and insert -- LICENSE --, therefor.

Signed and Sealed this  
Twenty-fifth Day of September, 2018

Andrei Iancu  
*Director of the United States Patent and Trademark Office*